United States Patent

Torenbeek et al.

Patent Number: 5,880,181
Date of Patent: Mar. 9, 1999

[54] GELS OF ORGANIC PEROXIDES

[75] Inventors: Reinder Torenbeek, Terwolde; Jacobus Johannes Antonius Eijmans, Deventer, both of Netherlands

[73] Assignee: Akzo Nobel NV, Arnhem, Netherlands

[21] Appl. No.: 656,237

[22] PCT Filed: Dec. 21, 1994

[86] PCT No.: PCT/EP94/04249

§ 371 Date: Jun. 6, 1996

§ 102(e) Date: Jun. 6, 1996

[87] PCT Pub. No.: WO95/18180

PCT Pub. Date: Jul. 6, 1995

[30] Foreign Application Priority Data

Dec. 27, 1993 [EP] European Pat. Off. ............. 93203699

[51] Int. Cl.$^6$ ................ C08K 3/34; C08L 67/00
[52] U.S. Cl. .......... 523/521; 523/506; 523/509; 524/492; 524/297; 524/313
[58] Field of Search ............. 523/506, 521, 523/509; 524/492, 493, 494, 356, 297, 223, 292, 127, 306, 322, 321, 311, 312, 313

[56] References Cited

U.S. PATENT DOCUMENTS

| | | | |
|---|---|---|---|
| 3,182,026 | 5/1965 | Leveskis | 252/430 |
| 3,507,800 | 4/1970 | Leveskis | 252/186 |
| 3,578,737 | 5/1971 | Ruggles et al. | 4/166 |
| 3,795,630 | 3/1974 | Jasper et al. | 252/426 |
| 3,806,477 | 4/1974 | Jasper et al. | 260/17 R |
| 3,859,240 | 1/1975 | Jasper et al. | 260/29.6 R |
| 4,982,878 | 1/1991 | Schmidt | 222/327 |
| 5,270,371 | 12/1993 | Cole et al. | 524/359 |

FOREIGN PATENT DOCUMENTS

| | | | |
|---|---|---|---|
| 0 299 917 | 1/1989 | European Pat. Off. | C09K 3/12 |
| 1 567 857 | 2/1972 | Germany | C09D 7/06 |
| 7006273 | 11/1970 | Netherlands . | |
| 1 275 172 | 5/1972 | United Kingdom | C08F 1/60 |

OTHER PUBLICATIONS

*Abstract 37572U–A*, (1 567 857), Argus Chemical Corp., dated Jun. 28, 1973.
*Chemical Abstract, Decorative panels*, (126278h) vol. 82, 1975, p. 51.
*Derwent Abstract*, JP 49102779, 1995.
*International Search Report*, PCT/EP94/04249, dated Apr. 26, 1995.

*Primary Examiner*—James J. Seidleck
*Assistant Examiner*—U. K. Rajguru
*Attorney, Agent, or Firm*—Ralph J. Mancini

[57] ABSTRACT

The present invention relates to a gel comprising A) a solution of at least one organic peroxide essentially solubilized in a phlegmatizer, B) at least one cellulose ester as thickening agent essentially solubilized in solution A, and C) at least one thixotropic agent selected from hydrogenated castor oil and fumed silica. These gels offer the advantages of essentially no phase segregation during storage, essentially no formation of solid crystals during storage, and easy metering into thermoset resins because of their thixotropic behavior. Furthermore, these gels may be transparent, with the advantage that brightly colored gels may be prepared therefrom.

10 Claims, No Drawings

GELS OF ORGANIC PEROXIDES

This application is a 371 of PCT/EP94/04249 filed Dec. 21, 1994.

The present invention relates to gels of organic peroxides and the use of said gels in the curing of thermoset resins.

The application of organic peroxides in thermoset resins was attended with some problems in the past when mixing small quantities of a liquid or powdered organic peroxide or formulations thereof into the resins. These problems led to the development of organic peroxide paste formulations.

In the past, these organic peroxide paste formulations were packaged in tubes. Such packaging would enable a skilled man to meter small quantities into thermoset resins. However, the dispensing still remained troublesome and inaccurate. The introduction of the cartridge some 15 years ago was a breakthrough in this respect. Nowadays, these cartridges comprising an organic peroxide paste formulation vary from very simple hand-operated types to automatically controlled dispensers adjusting the organic peroxide dosing level to regulate the curing speed.

The use of these cartridges requires certain properties of the organic peroxide paste formulations, such as no separation of liquid from the formulation and consequent leakage from the cartridge and no unwanted discharge of the paste from open cartridges.

It has now been found that the presently known organic peroxide paste formulations do not perform as required in cartridges.

Netherlands patent application 70 06273 discloses a transparent paste comprising an organic peroxide, a phlegmatizer, and a gel-forming agent, e.g., hydrogenated castor oil. U.S. Pat. Nos. 3,806,477 and 3,859,240 disclose pastes comprising a ketone peroxide, a phlegmatizer, and a gel-forming colloid, e.g., a cellulose ester or a silica aerogel. No mention is made of mixtures of the exemplified gel-forming colloids. U.S. Pat. Nos. 3,795,630 discloses stable peroxide compositions comprising an organic peroxide, a phlegmatizer in which the organic peroxide is not soluble, and a hydrophobic, alkyl groups containing silicon dioxide. U.S. Pat. No. 3,507,800 discloses compositions comprising organic peroxides, water, and a mutual solvent, which may be, among others, a phlegmatizer or a gel-forming material. German patent 1,567,857 discloses coloured pastes comprising organic peroxides, phlegmatizers, gelling agents, such as cellulose ethers, and a pigment. Finally, U.S. Pat. No. 3,182,026 discloses also a coloured organic peroxide composition comprising organic peroxides, phlegmatizer, pigment, and a gel-forming colloid, such as alkyl cellulose or finely divided silica.

These known pastes either are storage unstable, i.e., liquid separation occurs, and/or their thixotropic behaviour is such that dosing small quantities from a cartridge is difficult if not impossible.

Accordingly, one object of the present invention is to provide a composition comprising an organic peroxide which is storage stable. Another object is to provide a composition which has thixotropic properties.

The present invention relates to a gel comprising

A) a solution of at least one organic peroxide essentially solubilized in a phlegmatizer, B) at least one cellulose ester as thickening agent essentially solubilized in solution A, and C) at least one thixotropic agent selected from hydrogenated castor oil and fumed silica.

These gels offer the advantages of essentially no phase segregation during storage and easy metering into thermoset resins because of their thixotropic behaviour. Furthermore, the organic peroxide is essentially solubilized. So, essentially no solid crystals are present in the composition and there is no crystal growth on storage.

Examples of organic peroxides to be used in the compositions of the present invention include hydroperoxides, such as cumene hydroperoxide; diacyl peroxides, such as, optionally substituted, dibenzoyl peroxide; peroxyester, such as tert-butyl peroxy benzoate and tert-butyl peroxy 2-ethylhexanoate; peroxyketals, such as 1,1-bis(tert-butylperoxy)-3,3,5-trimethylcyclohexane; and ketone peroxides, such as cyclohexanone peroxide, acetone peroxide, acetyl acetone peroxide, methyl ethyl ketone peroxide, and methyl isobutyl ketone peroxide. Preferred are ketone peroxides.

The phlegmatizers to be used in the compositions of the present invention have to be able to solubilize the ketone peroxide and the cellulose ester. Examples of such phlegmatizers include phthalates, such as dimethyl phthalate, diethyl phthalate, dibutyl phthalate, diisobutyl phthalate, and butyl benzyl phthalate; glycols, such as diethylene glycol, propylene glycol, and diacetone alcohol; citrates, such as acetyl tributyl citrate; benzoates, such as ethylene glycol dibenzoate and propylene glycol dibenzoate; phosphates, such as triethyl phosphate and tributyl phosphate; acid esters, such as esters of adipic acid, glutaric acid, maleic acid, fumaric acid, and succinic acid; butyrates, such as 2,2,4-trimethyl-1,3-pentanediol diisobutyrate; and mixtures thereof. The amount of phlegmatizer present in the composition of the present invention is preferably between 5 and 95 wt %, more preferably between 40 and 85 wt %, based on the total weight of the composition.

The cellulose ester used in the compositions of the present invention is soluble in the solution of peroxide and phlegmatizer and raises the viscosity of the composition. Cellulose esters are the reaction product of cellulose and acid compounds. Examples of such acid compounds include acetic acid, propionic acid, butyric acid, phthalic acid, trimellitic acid, and mixtures thereof. Preferred is a cellulose ester where the cellulose is esterified with a mixture of acetic acid and butyric acid. The amount of cellulose ester present in the composition is preferably between 0.5 and 10 wt %, more preferably between 1 and 4 wt %, based on the total weight of the composition. The thixotropic agent is selected from hydrogenated castor oil and fumed silica.

The hydrogenated castor oil used in the compositions of the present invention swells in the composition to form a gel structure that prevents the liquid from flowing unless shear forces are applied and the structure breaks down, i.e., when the composition is squeezed out of the cartridge. Examples of commercially available products are Rheocin® (ex Süd Chemie), Thixcin® (ex Rheox Inc.), and Luvotix® (ex Lehmann & Voss). The amounts of hydrogenated castor oil present in the composition of the present invention range preferably from 0.2 to 7 wt %, more preferably from 0.5 to 4 wt %, based on the total weight of the composition.

Fumed silica is obtained by flame hydrolysis of $SiCl_4$. It is a very pure $SiO_2$ and due to the absence of impurities it is the only inorganic thixotropic agent to be used in the present transparent gels. Examples of commercially available fumed silica include Aerosil® (ex Degussa), Cab-O-Sil® (ex Cabot), and HDK® (ex Wacker). The amounts of fumed silica present in the composition are preferably from 1 to 10 wt %, more preferably from 2 to 7 wt %, based on the total weight of the composition.

The stability and the application properties of the compositions of the present invention may be improved or adapted by known additives such as sequestering agents, e.g. dipicolinic acid, and antioxydants, e.g., phenolic compounds such as 2,6-di(tert-butyl)-4-methyl phenol and para-nonyl phenol.

Optionally, a solvent may be present in the composition of the present invention. The solvent has to be sufficiently compatible with the other compounds in the composition not to affect the solubility of the organic peroxide and the cellulose ester in the phlegmatizer. Examples of such solvents include water, ketones, alcohols, cumene, and esters.

The active oxygen content of the gels of the present invention is preferably between 1 and 10%.

Although the present invention is not limited to transparent gels, these are the preferred gels. More particularly, because the pigment or dye is not hidden by any solid material as would be the case with non-transparent gels, transparent gels may be intensely bright in colour when coloured by blending in pigments or dyes. Furthermore, less pigment or dye is necessary than in the preparation of a coloured non-transparent gel. Preferred are organic pigments such as azo condensation pigments and indanthrones. Brightly coloured gels are particularly suitable for Facilitating mixing into thermoset resins because they can easily be traced and, accordingly, a homogeneous mixture of resin and peroxide formulation can be obtained.

The sequence in which the compounds are added is not essential to the preparation of the gels of the present invention. Often, the organic peroxide is purchased in a liquid formulation together with a phlegmatizer for safety reasons. The cellulose ester and the thixotropic agent may be mixed with the organic peroxide solubilized in the phlegmatizer. It is also possible to dissolve the cellulose ester and to disperse the thixotropic agent in a phlegmatizer. The resulting mixture can be added to the organic peroxide, which may already be solubilized in phlegmatizer. High shear mixers may be used to prepare the gel. Optionally, the composition may be aged to enhance its thixotropic behaviour.

The gels of the present invention may be used in the curing of thermoset resins, such as unsaturated polyester resins or vinyl ester resins. Unsaturated polyester resins have found a wide range of applications in the automotive industry, in car-repair shops, and in do-it-yourself jobs. Furthermore, both of the exemplified resins may be applied in the preparation of castings and laminates.

The invention will be further illustrated by the following examples which are not to be construed as limiting the invention in any way. The scope of the invention is to be determined from the claims appended hereto.

EXAMPLES

The following materials were applied in the examples:

Trigonox® HM Methyl isobutyl ketone peroxide in phthalate, ex Akzo Chemicals

Trigonox® 113 Cyclohexanone peroxide in phthalate, ex Akzo Chemicals

Butanox® M50 Methyl ethyl ketone peroxide in phthalate, ex Akzo Chemicals

Trigonox® 44B Acetyl acetone peroxide in diacetone alcohol+diethylene glycol, ex Akzo Chemicals Trigonox® K-80 Cumenehydroperoxide 80% in alcohol, ex Akzo Chemicals Trigonox® C-B75 Tert-butylperoxy benzoate 75% in phthalate, ex Akzo Chemicals Trigonox® 29 1,1-bis(tert-butylperoxy)-3,3,5-trimethylcyclohexane, ex Akzo Chemicals CAB® 381-20 Cellulose acetate/butyrate (13%/37%); Mn=70 000, ex Eastman Chemicals CAB® 381-2 Cellulose acetate/butyrate (13%/37%); Mn=40 000, ex Eastman Chemicals CAB® 500-5 Cellulose acetate/butyrate (4%/51%), ex Eastman Chemicals CAB® 531-1 Cellulose acetate/butyrate (2.8%/50%), ex Eastman Kodak Rheocin® R Hydrogenated castor oil, ex SudChemie AG Thixcin® R Hydrogenated castor oil, ex Rheox Inc.

HDK®-N20 Fumed silica, ex Wacker

Kodaflex® TXIB 2,2,4-trimethyl-1,3-pentanediol diisobutyrate, ex Eastman Kodak

EXAMPLE 1

A solution of cyclohexanone peroxides was prepared by reacting cyclohexanone and $H_2O_2$ in dimethyl phthalate, washing and removal of the water phase. The solution was stabilized with 100 mg/kg dipicolinic acid. The total active oxygen content was analysed to be 10.0%.

Starting with 813 g of this solution a gel was prepared by adding 127 g diisobutyl phthalate, 30 g CAB® 381-20 and 30 g Rheocin® R, respectively, in a vessel stirred with a high-shear mixer. The cellulose ester was dissolved and the hydrogenated castor oil swelled during mixing. After 15 minutes the mixing was stopped. The gel was transparent and thixotropic in behaviour: after 24 hours the viscosity, determined with a Brookfield HB rotational viscometer provided with spindle TB at 1 rev/minute, was 359 Pa.s. After stirring of the gel the viscosity was 196 Pa.s.

The active oxygen content was 6.5%. The gel was stored for 6 months at 20° C. During this period no separation of liquid from the gel was observed. The relative loss of active oxygen was only 0.9%.

COMPARATIVE EXAMPLES A–D

According to the procedure as used in Example 1 compositions were prepared with the following formulation.

| Example | A | B | C | D |
|---|---|---|---|---|
| Cyclohexanone peroxide solution (see example 1) | 813 g | 813 g | 813 g | 813 g |
| CAB ® 381-20 | 30 g | 60 g | — | — |
| Rheocin ® R | — | — | 30 g | 60 g |
| Diisobutyl phthalate | 157 g | 127 g | 157 g | 127 g |

The viscosity of the compositions of Examples A to D was determined with a Brookfield HB rotational viscometer provided with spindle TB at 1 rev/minute. The compositions of Examples A and B were transparent, fluid liquids with a viscosity of 6 Pa.s and 83 Pa.s, respectively. Due to the low viscosity without cellulose ester the preparation of the compositions of Examples C and D required twice the mixing time of Example 1. The composition of Example C was a white turbid liquid with a viscosity of 27 Pa.s. On storage it showed segregation of a clear liquid amounting to 45 ml per 400 g composition after 4 weeks at 20° C. The composition of Example D resulted in a white, semi-transparant gel with a thixotropic structure. The viscosity (after 24 h storage) was 432 Pa.s, after stirring it was 262 Pa.s. On storage the gel showed syneresis, i.e., expulsion of liquid, 0.5 ml per 400 g gel after 4 weeks at 20° C.

An advantage of the combination of the thickening and the thixotropic agent is the improved behaviour of the gel in cartridges. Those cartridges consist of a rigid plastic tube closed with a cap at one side and fitted with a piston at the other side. The gel is dosed by removing the cap, moving the piston over a preset distance with the dosing machine, and removing the gel that is extruded from the tube.

To show the difference in suitability, cartridges were filled with the compositions of Examples 1, B, and D, respectively. The cartridges were stored in a horizontal position in cardboard boxes. The composition of Example B passed through the piston as well as the cap and contaminated the cardboard. After removal of the cap all of the composition flowed from the cartridge as it lacked a thixotropic structure. In the composition of Example D some liquid was separated out by syneresis of the gel. This liquid passed through the piston and contaminated the cardboard. The gel of Example 1 neither separated nor showed any dripping after removal of the cap. It could be dosed without any problem.

EXAMPLES 2–6

The following examples show that the invention is applicable to different types of organic peroxides. The following compositions were prepared:

| Example | 2 | 3 | 4 | 5 | 6 |
| --- | --- | --- | --- | --- | --- |
| Trigonox ® HM | 818 | 940 | — | — | — |
| Trigonox ® 113 | — | — | 940 | — | — |
| Butanox ® M50 | — | — | — | 950 | 818 |
| Diisobutyl phthalate | 122 | — | — | — | 122 |
| CAB ® 381-20 | 30 | 30 | 30 | — | 30 |
| CAB ® 381-2 | — | — | — | 30 | — |
| Rheocin ® R | 30 | 30 | 30 | 20 | 30 |
| Active oxygen % | 7.2 | 8.2 | 7.0 | 8.5 | 7.3 |
| Viscosity Pa · s | 170 | 186 | 192 | 150 | 112 |
| Viscosity after stirring Pa · s | 122 | 115 | 96 | 80 | 67 |

The viscosity was determined with a Brookfield HB rotational viscometer provided with spindle TB at 1 rev/minute. All formulations were transparent gels with a thixotropic structure, as is demonstrated by the viscosity figures before and after stirring.

EXAMPLE 7 And COMPARATIVE EXAMPLES E–F

In the same way as in Example 1, gels were prepared with fumed silica as the thixotropic agent.

| Example | E | 7 | F |
| --- | --- | --- | --- |
| Cyclohexanone peroxide solution (see example 1) | 813 | 813 | 813 |
| CAB ® 381-20 | — | 20 | — |
| HDK ® -N20 | 50 | 30 | 30 |
| Diisobutyl phthalate | 137 | 137 | 157 |

The viscosity was determined with a Brookfield HB rotational viscometer provided with spindle TB at 1 rev/minute. The composition of Example E was a thixotropic composition, with a viscosity of 461 Pa.s 1 day after preparation and of 125 Pa.s after breakdown of the structure by stirring. On storage some clear liquid was separated out, approximately 2 ml per 400 g composition after 4 weeks. The composition of Example 7 had a lower viscosity, 128 Pa.s, and 32 Pa.s, after stirring, but it did not show separation within 4 weeks. The composition of Example F was a thick, fluid liquid and separated out approximately 4 ml per 400 g composition of thin liquid within 4 weeks.

The composition of Example F was not suitable to be packed either in tubes or in dosing cartridges, the composition of Example E was only suitable for packing into tubes with a sealed end. It could not be packed into cartridges because of leakage of migrating liquid. The composition of Example 7 was suitable for both tubes and cartridges.

These examples show that, as regards the quality of the paste, thickening with the combination of cellulose ester and silica has advantages over thickening with silica alone.

EXAMPLE 8

A coloured gel was prepared in the same manner as described in Example 1 by mixing 930 g Triganox® 113, 30 g CAB® 381-20, 30 g Rheocin® R, 5 g p-nonylphenol, 0.1 g dipicolinic acid, and 5 g indanthrone, a blue organic pigment. The viscosity was determined with a Brookfield HB rotational viscometer provided with spindle TB at 1 rev/minute. The gel was thixotropic in behaviour: the viscosity was 77 Pa.s, after stirring it was 45 Pa.s. The active oxygen content was 6.98%. On storage no separation was observed after 8 weeks at 20° C.

EXAMPLES 9–11

The following examples show that the invention is applicable to formulations comprising acetyl acetone peroxide. The compositions were aged for 56 days. The viscosity was determined with a Brookfield HB rotational viscometer provided with spindle TB at 1 rev/minute.

| Example | 9 | 10 | 11 |
| --- | --- | --- | --- |
| Trigonox ® 44B | 813 | 557 | 548 |
| Dimethyl phthalate | 122 | 370 | 365 |
| CAB ® 381-20 | 30 | — | — |
| CAB ® 500-5 | — | 40 | 39 |
| Rheocin ® R | 30 | 29 | — |
| HDK ®-N20 | — | — | 45 |
| Dipiclinic acid | 0.1 | 0.05 | 0.05 |
| p-nonyl phenol | 5 | 4 | 3 |
| Active oxygen % | 3.2 | 2.2 | 2.2 |
| Viscosity Pa · s | 32 | 32 | 282 |
| Viscosity after stirring Pa · s aged for 56 days | 6 | 16 | 67 |
| Viscosity Pa · s | 553 | 418 | — |
| Viscosity after stirring Pa · s | 228 | 138 | — |

EXAMPLE 12

625 g Trigonox® K-80 was mixed up with 325 g Kodaflex® TXIB and 20 g CAB® 381-20. 30 g Rheocin® R was added and dispersed with a high shear mixer. A transparent gel was obtained with a thixotropic structure: the viscosity (Brookfield HB, spindle TB, at 1 rpm) was 436 Pa.s. After stirring of the gel the viscosity was 190 Pa.s. After eight weeks storage at 20° C. the viscosity of the gel had not changed.

EXAMPLE 13

950 g Trigonox® C-B75 was mixed up with 20 g CAB® 381-20 and stirred until the solution was clear. 30 g Rheocin® R was added and dispersed with a high shear mixer. A nice transparent thixotropic gel was obtained with a viscosity (Brookfield HB, spindle TB, at 1 rpm) of 323 Pa.s and after stirring of the gel 214 Pa.s. After eight weeks storage at 20° C. the gel showed no separation. The viscosity had not changed.

EXAMPLE 14

40 g CAB® 531-1 was dissolved in 394 g dibutylphthalate at 80° C. The solution was cooled and 526 g Trigonox®

29 was admixed. Finally 40 g Thixcin® R was added and dispersed. A transparent gel was the result with a viscosity of 267 Pa.s after 1 day storage (Brookfield HB, spindle TB, at 1 rpm). After stirring the viscosity was 129 Pa.s. After eight weeks storage at 20° C. the gel showed no separation. The viscosity had not changed.

We claim:

1. A gel comprising

A) a solution of at least one organic peroxide essentially solubilized in a phlegmatizer, B) at least one cellulose ester as thickening agent essentially solubilized in the solution of A), and C) at least one thixotropic agent selected from the group consisting of hydrogenated castor oil and fumed silica.

2. The gel of claim 1 wherein said organic peroxide is a ketone peroxide.

3. The gel of claim 2 wherein the organic peroxide is selected from the group consisting of cyclohexanone peroxide, acetone peroxide, acetyl acetone peroxide, methyl ethyl ketone peroxide, and methyl isobutyl ketone peroxide.

4. The gel of claim 1 wherein said phlegmatizer is selected from the group consisting of phthalates, glycols, citrates, benzoates, phosphates, adipic acid ester, glutaric acid ester, maleic acid ester, fumaric acid ester, succinic acid ester, butyrates, and mixtures therof.

5. The gel of claim 4 wherein said phlegmatizer is selected from the group consisting of dimethyl phthalate, diethyl phthalate, dibutyl phthalate, diisobutyl phthalate, butyl benzyl phthalate, diethylene glycol, propylene glycol, diacetone alcohol, acetyl tributyl citrate, ethylene glycol dibenzoate, propylene glycol dibenzoate, triethyl phosphate, tributyl phosphate, adipic acid ester, glutaric acid ester, maleic acid ester, fumaric acid ester, succinic acid ester, 2,2,4-trimethyl-1,3-pentanediol diisobutyrate, and mixtures thereof.

6. The gel of claim 1 wherein said cellulose ester is the reaction product of cellulose and at least one acid compound wherein said acid compound is selected from the group consisting of acetic acid, propionic acid, butyric acid, phthalic acid, trimellitic acid, and mixtures thereof.

7. The gel of claim 6 wherein said acid compound is selected from the group consisting of acetic acid, butyric acid, and mixtures thereof.

8. The gel of claim 1 wherein said gel is coloured.

9. A method of curing thermoset resins which comprises applying thereto, an effective amount of the gel according to claim 1.

10. The method of claim 9 wherein said thermoset resin is an unsaturated polyester resin.

* * * * *